May 14, 1929. C. DAVIS 1,713,331
HITCH FOR CONNECTING TRACTORS TO DUMP WAGONS, ETC
Filed March 10, 1926 2 Sheets-Sheet 1

Inventor,
Cloyd Davis,

May 14, 1929.  C. DAVIS  1,713,331
HITCH FOR CONNECTING TRACTORS TO DUMP WAGONS, ETC
Filed March 10, 1926  2 Sheets-Sheet 2

Witnesses
Howard D. Orr.

Inventor,
Cloyd Davis,
By
Attorney

Patented May 14, 1929.

1,713,331

UNITED STATES PATENT OFFICE.

CLOYD DAVIS, OF MINEOLA, NEW YORK.

HITCH FOR CONNECTING TRACTORS TO DUMP WAGONS, ETC.

Application filed March 10, 1926. Serial No. 93,816.

This invention relates to devices for connecting a tractor to a dump wagon or other trailer.

The object is to provide a simple, strong and durable device especially adapted to connect a tractor having the usual draw bar construction to a four wheel dump wagon in general use in excavation and construction work, said device having means for connection to the wagon to support the load of the front end thereof after the front axle, front wheels and the lower ring of the usual fifth wheel have been removed therefrom, and to permit the wagon to make short turns in following the tractor and to freely partake of the necessary lateral rocking motion caused by inequalities in the ground.

Another object is to provide a connecting means which rigidly supports the front end of the wagon in its normal elevated position and in close proximity to the rear end of the tractor, the device including means for coaction with the remaining upper ring of the fifth wheel to permit the latter to function in the usual manner, thus avoiding undue strain on the king bolt and other parts of the wagon structure.

A further object is to provide a structure which may be easily and quickly connected to the tractor in a manner to suspend the weight of the front end of the wagon directly beneath the axle housings and at widely separated points adjacent to the traction wheels, while a separate connection is made to the usual draw bar of the tractor to cause the strain of pulling the attached load forward to be directed to points best adapted to withstand such strain, thus preventing undue wear and tear on the tractor and, by reason of such manner of attachment, to cause the tractor to be held to the ground at the front end thereof.

A full and complete understanding of the invention may be obtained from a consideration of the following detailed description, taken in connection with the accompanying drawings forming a part of this specification; it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 3 is a detail plan view of a portion of the invention; and

Figure 4 is a detail transverse section of the same.

Figure 1:
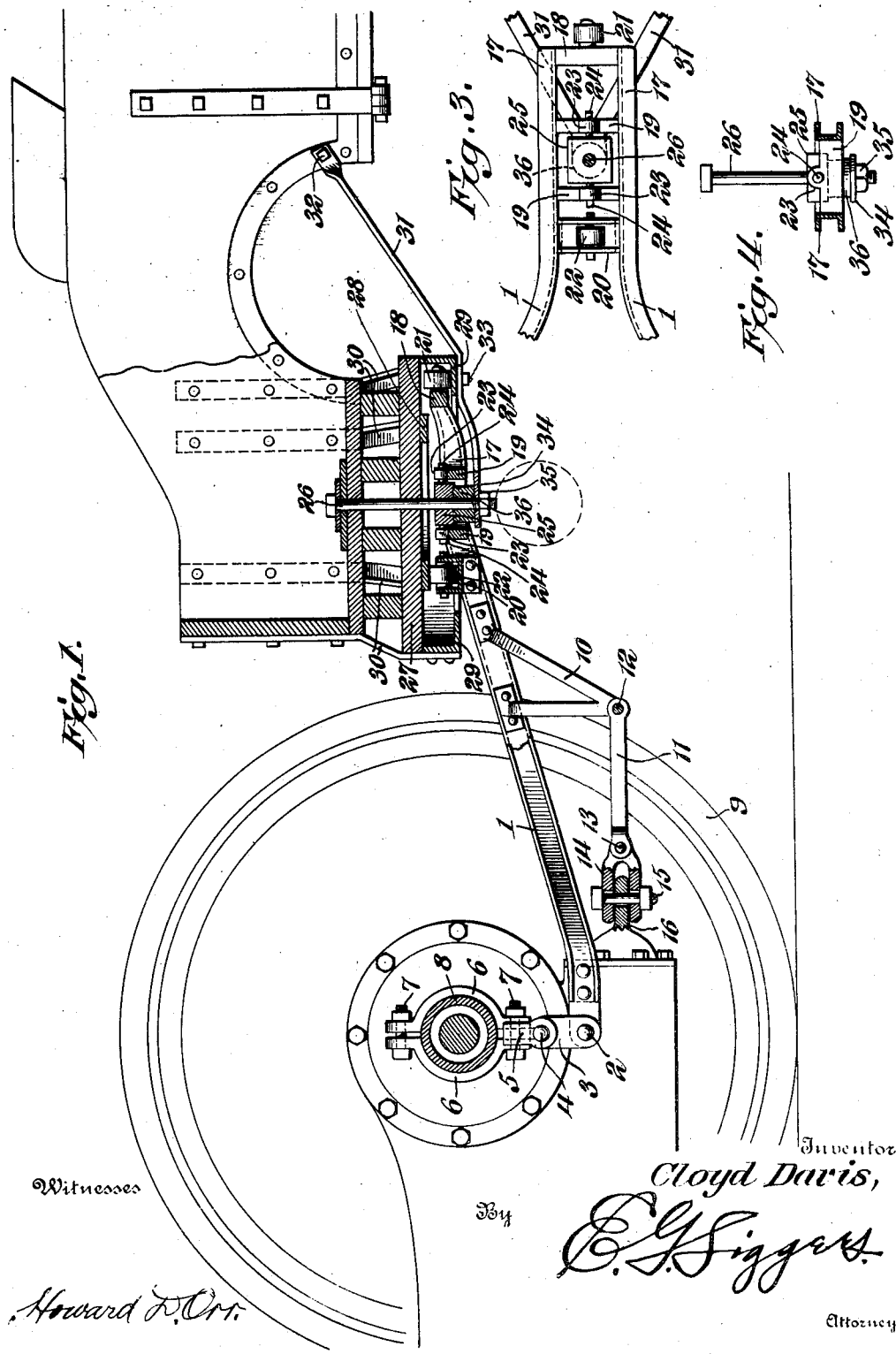
Figure 1 is a longitudinal sectional view through the device shown in connection with the adjacent portions of a tractor and an ordinary dump wagon.

The preferred embodiment of the invention comprises a pair of spaced side bars 1 formed preferably of channel iron or any other suitable form of metal bar having sufficient strength to withstand the strain to which same is subjected, said bars preferably having their channels facing outwardly and flaring outwardly towards their front ends, where they are equipped with suitable eye plates for the reception of transverse pivotal pins 2. The pins 2 hingedly connect the side bars 1 to the lower ends of longitudinally swinging hanger links 3, the upper ends of which are pivoted, by means of other transverse pivotal pins 4, to apertured blocks 5 adapted to be rigidly held between the lower, depending ears of clamp members 6, which, together with corresponding upper ears are held in position around the axle housings by means of bolts 7, which rigidly secure the flexible connections in position on said axle housings 8 in close proximity to the traction wheels 9, as clearly shown in Figure 2 of the drawings. This manner of connecting the bars 1 to the tractor at points adjacent to the wheels thereof places the load of the front end of the wagon where it can best be sustained by the tractor structure.

Figure 2:
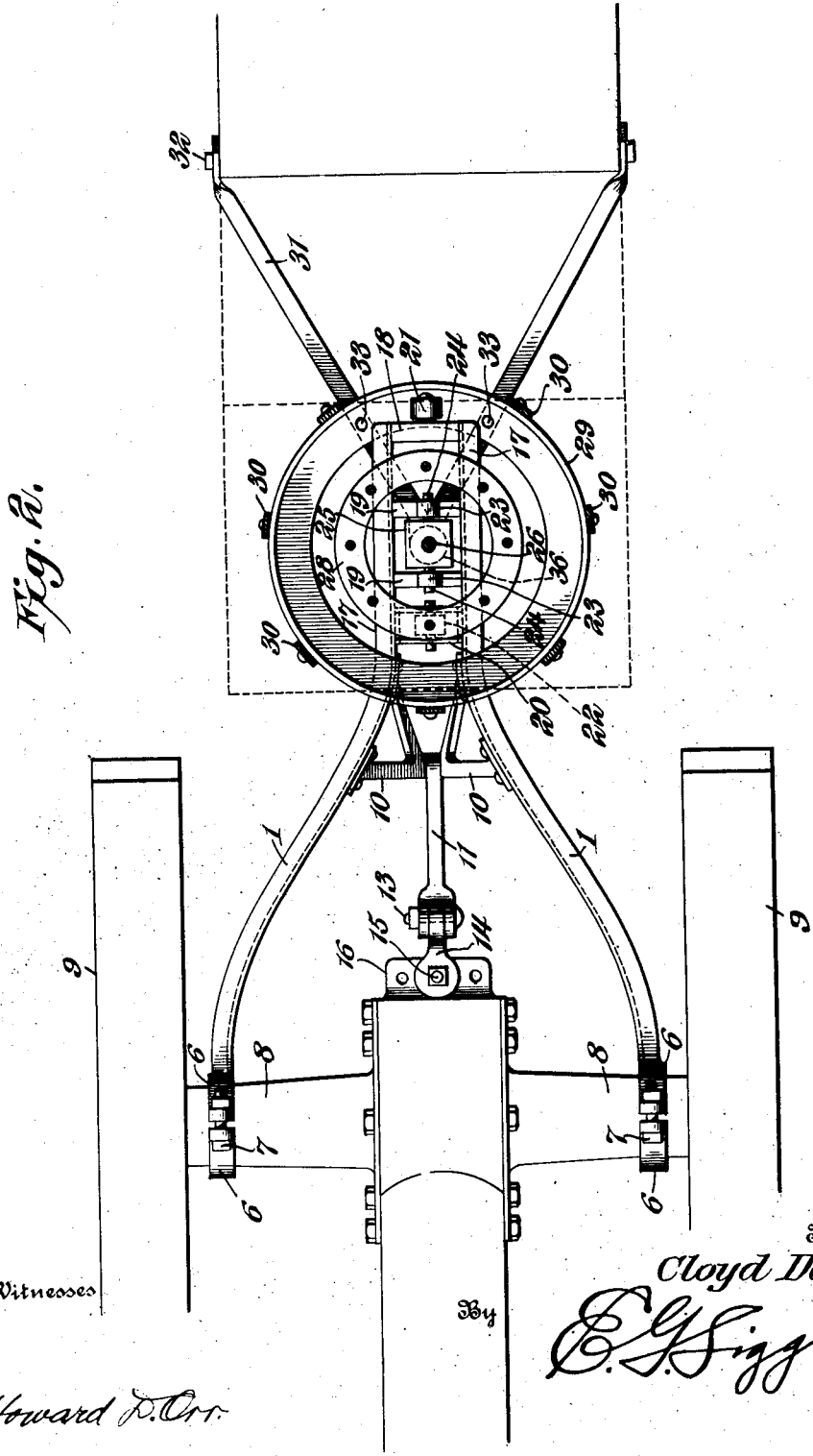
Figure 2 is a plan view thereof, the wagon being shown diagrammatically.

The rear portions of the bars 1 are inclined upwardly at a slight angle to bring the terminals in proper position for engagement with the wagon, as shown in Figure 1, and at the same time the said bars are bowed or curved to converge towards each other, as shown in Figure 2, the rear ends being arranged in a substantially horizontal plane and parallel to each other.

Intermediate of their ends, the bars 1 are equipped with substantially V-shaped, depending brackets 10, each having a pair of arms terminating at their upper ends in suitable attaching plates for attachment to the bars, as by rivets or bolts, and said brackets are converged inwardly towards each other at their lower, free ends, so as to snugly receive between the rear end of a draft link 11, the same being pivotally connected by a transverse rivet or bolt 12.

The front end of the draft link 11 is bifurcated and is hinged for up and down swinging action by a horizontal, transverse pivotal bolt 13 to the front end of a clevis 14, which is, in turn, hinged for horizontal, transverse swinging action by a vertically disposed bolt 15 passing through the central aperture of the usual draft bar cap 16 forming part of the tractor structure.

The hinging of the front terminals of the side bars 1 in the manner shown and described allows of a limited forward and backward movement of the connecting frame constituted by the said bars 1 so that the tractor may partake of a limited amount of upward movement at the front end, as when starting up an incline, without being held in check by the weight supporting arms 1. The strain of pulling the load of the wagon and its contents is imparted to the link 11, which is free to swing upwardly at either end, and this manner of making the connections serves to effectually hold the tractor down to its work, and furthermore, the flexibility provided by the depending links 3 permits the free and independent, lateral rocking movements of the tractor, occasioned by inequalities in the ground, without effecting the front end of the wagon, which is also free to partake of independent rocking movements by means to be described.

The rear horizontal and parallel terminal portions 17 of the bars 1 are connected together by a rear, terminal cross bar 18, spaced intermediate cross bars 19 located a slight distance from the bar 18 and by a front cross bar 20, preferably formed of channel iron arranged with the channel uppermost and located somewhat in advance of the adjacent intermediate bar 19. These several cross bars serve to rigidly hold the rear end of the frame together and also provide means for mounting parts for connection with the front end of the wagon, after the front axle, front wheels and the lower ring of the fifth wheel have been removed, as hereinbefore stated.

The rear cross bar 18 is provided with a central, horizontal, rearwardly extending trunnion upon which is mounted a transversely disposed roller 21, and the front channel bar 20 is provided with a similar roller 22 mounted on a suitable shaft carried by the flanges of the channel iron and arranged longitudinally of the connecting frame and in exact longitudinal alinement with the axis of the rear roller 21.

The intermediate cross bars 19 are provided with central, upstanding ears 23 having suitable apertures for the reception of longitudinally alined trunnions 24 of a pivotal block 25, said trunnions 24 being also in exact longitudinal alinement with the axes of the rollers 21 and 22.

The block 25 which is thus free to rock laterally of the frame, is provided with a suitable central, vertical aperture for the reception of the king bolt of the wagon which is ordinarily used to swivel the front axle and wheels of the four wheel wagon, said bolt extending downwardly through the usual timber construction 27 at the front of such wagons, and which carries the upper ring 28 of the fifth wheel.

A circular track 29 formed of angle iron and of somewhat greater diameter than the fifth wheel, is secured beneath the lowermost sill of the structure 27, and is rigidly held to the front end of the body of the wagon by depending hangers 30, any suitable number of the same being employed. The circular track 29 has an inwardly extending, annular flange to constitute the track proper, and said flange is located somewhat below the plane of the upper half or ring 28 of the fifth wheel, and at the proper position to receive the rear roller 21, which bears directly thereon, while the front roller 22 bears upwardly against the under side of the ring 28 when the king bolt is in position in the aforesaid pivotal block 25. With the parts thus assembled it will be seen that the strain caused by the weight of the front end of the wagon and the contents thereof will be sustained by the rollers 21 and 22 in equal proportions and that the king bolt will be relieved of all lateral strain that would result were the rollers and tracks not present.

The lower end of the king bolt is further braced and reinforced by inclined brace arms 31 which are connected at their rear, outer ends by bolts 32 to that portion of the wagon body in rear of the usual transverse bridge or tunnel where the front wheels turn under, and the front ends of said brace arms are extended forwardly and beneath the lower track 29, to which they are secured, as at 33, and are brought together to form an ear 34 surrounding and bracing the lower end of the king bolt. A nut 35 is threaded on the lower end of the king bolt; and between the ear 34 and the lower face of the pivotal block 25, there is interposed a spacing block 36 which holds all parts in proper spaced relation to prevent rattle or lost motion and to permit the ear 34 to pass beneath the cross bars 19.

From the foregoing it will be seen that, by reason of the longitudinal alinement of the rollers and the trunnions of the pivotal block, the wagon body may rock laterally independent of the tractor or the connecting frame, without undue strain on the king bolt; that the weight of the front end of the wagon body is taken off of the king bolt and imparted through the rollers directly to the strong and rigid side bars of the connecting frame and that the manner of attaching the connecting frame to the tractor imparts the weight of the load to the axle housings at widely separated points adjacent to the traction wheels where there is least tendency to strain the tractor structure, such spaced connections also serving to maintain the point of connection with the king bolt of the wagon in the same relation to the rear wheels of the tractor. It will further be seen that the rugged construction of the brackets 10 and link 11 and the method of connecting the same together, will rigidly support the load of the wagon and contents and take the strain of pulling the same forward with the tractor while the tractor is free to partake of more or less independent movement due to the flexible connections provided by the links 3. These features are particularly advantageous where tractors are employed in hauling dirt wagons in big construction or excavating operations, as, by the removal of the front wheels of the ordinary four-wheel dump wagons, the latter may be hitched closer to the tractor and caused to take a short turn in trailing the tractor, without danger of interference with the rear wheels of the same, this close connection being impossible where an ordinary hitch is employed and the front wheels of the wagon employed.

What is claimed is:—

1. In a hitching device for a tractor and wagon, a frame having spaced side bars terminally connected at their front ends to the tractor to suspend the load beneath the axle housings, the rear ends of the bars being joined together and flexibly connected to the king bolt of the wagon after the front wheels and axle of the wagon have been removed.

2. A hitching device for a tractor and wagon, comprising, in combination, a frame connected to the tractor to suspend the load from the axle housing; flexible connections between the frame and the king bolt of the wagon the upper portion of the fifth wheel being secured to the wagon; a circular track secured to the wagon and surrounding the upper portion of the fifth wheel; and rollers carried by the frame for coaction with the track to support the front end of the wagon and permit turning thereof.

3. In a hitching device for a tractor and wagon in combination, a frame having spaced side bars terminally connected at their front ends to the tractor to suspend the load beneath the axle housings and adjacent to the traction wheels, the rear ends of the bars being joined together and flexibly connected to the king bolt of the wagon after the front wheels, axle and lower portion of the fifth wheel have been removed, the upper portion of the fifth wheel being secured to the wagon, a concentric circular track secured to the wagon in surrounding relation to the upper portion of the fifth wheel, and rollers carried by the frame for coaction with the track to support the front end of the wagon and permit turning thereof.

4. In a device for coupling a tractor to a wagon from which the front axle, wheels and lower portion of the fifth wheel have been removed, in combination, a frame comprising side bars adapted to be connected at their front ends to the tractor beneath the axle housings and adjacent to the traction wheels, and means connected to the side bars to limit the forward and rearward movement of the frame while supporting the load, and means for connecting the rear end of the frame to the king bolt of the wagon to support the weight of the front end of the latter and permit the same to turn or rock transversely.

5. In a device for hitching a wagon to a tractor, in combination a frame, means for terminally connecting said frame at its front end to the tractor to suspend the load beneath the axle housings and adjacent to the traction wheels, means for connecting the rear end of the frame to the wagon, and an independent connection between said side bars and the tractor below and in rear of the first-named connection, said second connection providing for a limited lateral movement between the frame and the tractor.

6. In a device for hitching a wagon to a tractor, in combination, a frame having spaced side bars, means for connecting said side bars at their front ends to the tractor, means for connecting the rear ends of the side bars to the wagon after the front wheels and axle have been removed, said connection being made with the king bolt of the wagon to permit the latter to rock transversely, and other means connected to the side bars to support the front end of the wagon in front and rear of the king bolt.

7. In a device for hitching a wagon to a tractor, in combination, a frame having spaced side bars, means for connecting said side bars at their front ends to the tractor to suspend the load beneath the axle housings, means for flexibly connecting the rear ends of the side bars to the king bolt of the wagon after the front wheels, axle and lower portion of the fifth wheel have been removed, and other means for connecting the rear ends of the side bars to the front end of the wagon in front and in rear of the king bolt connection.

8. In a device for hitching a wagon to a tractor, in combination, a frame having spaced side bars, means for connecting said side bars at their front ends to the tractor to suspend the load beneath the axle housings, other means connecting said side bars to the tractor below and in rear of the first-named connection, means for flexibly connecting the rear ends of the side bars to the king bolt of the wagon after the front wheels, axle and lower portion of the fifth wheel have been removed, and other means for connecting the rear ends of the side bars to the front end of the wagon in front and in rear of the king bolt connection.

9. In a device for hitching a wagon to a tractor, in combination, a frame having spaced side bars terminally connected at their front ends to the tractor to suspend the load beneath the axle housings and adjacent to the traction wheels, the rear ends of the bars being flexibly connected to the king bolt of the wagon after the front wheels, axle and lower portion of the fifth wheel have been removed, the upper portion of the fifth wheel being secured to the wagon, a concentric, circular track secured to the wagon in surrounding relation to the upper portion of the fifth wheel, rollers carried by the frame for coaction with the track and said portion to support the front end of the wagon and permit turning thereof, and means connecting the frame to the draw bar cap of the tractor to draw the wagon with the tractor.

10. In a device for coupling a tractor to a wagon from which the front axle, wheels and lower portion of the fifth wheel have been removed, in combination, a frame adapted to be connected at its front, free end beneath the axle housings and adjacent to the traction wheels, said connections including means for clamping the housings and depending links swivelled to said clamping means at their upper ends and to the frame at its lower end to permit limited forward and rearward movement of the frame while supporting the load, depending arms carried by the frame, a longitudinal link swivelled at its rear end to said frame, a clevis swivelled to the front end of the link and adapted to be connected to the draw bar cap of the tractor to pull the load forward, and means for connecting the rear end of the frame to the king bolt of the wagon to support the weight of the front end of the latter and permit the same to turn or to rock transversely.

11. In a device for coupling a tractor to a dump wagon from which the front axle, wheels and lower ring of the fifth wheel have been removed, in combination, a connecting frame comprising opposite side bars, clamps adapted to be connected to the tractor axle housings adjacent to the wheels, longitudinally swingable hanger links swivelled at their upper ends to the lower portions of said clamps and similarly connected to the front ends of the side bars, said bars being bent upwardly and extending rearwardly and converging, the rear end portions thereof being parallel to each other and arranged substantially horizontal, cross arms connecting the rear ends of the side bars, means carried by the cross arms for connection to the king bolt and coaction with the fifth wheel ring, a separate, circular track attached to the wagon in concentric relation to the king bolt for cooperation with said means, depending, angular arms carried by the side bars intermediate of their ends, said depending arms extending inwardly toward each other, a longitudinally disposed link pivoted at its rear end between the lower ends of said depending arms for vertical swinging movement, a clevis having a vertical pivotal connection to the draw bar cap of the tractor and having a horizontal pivotal connection with the front end of said link.

12. In a device for coupling a tractor to a dump wagon from which the front axle, wheels and lower ring of the fifth wheel have been removed, in combination, a connecting frame comprising opposite side bars, clamps adapted to be connected to the tractor axle housings adjacent to the wheels, longitudinally swingable hanger links swivelled at their upper ends to the lower portions of said clamps and similarly connected to the front ends of the side bars, said bars being bent upwardly and extending rearwardly and converging, the rear end portions thereof being parallel to each other and arranged substantially horizontal, cross arms connecting the rear ends of the side bars, means carried by the cross arms for connection to the king bolt and coaction with the fifth wheel ring, and a separate, circular track attached to the wagon in concentric relation to the king bolt for cooperation with said means.

13. In a device for coupling a tractor to a dump wagon from which the front axle, front wheels and the lower ring of the fifth wheel have been removed, the upper ring of the fifth wheel being secured to the wagon, in combination, a connecting frame flexibly connected to and beneath the axle housings of the tractor and adjacent to the traction wheels thereof, depending arms carried by the frame, a longitudinally disposed draft link connected at its ends, by transverse horizontal pivots, to the depending arms and the draw bar cap of the tractor respectively, the rear end of said frame being elevated, inner cross arms connecting the frame adjacent its rear end, a pivotal block having a central, vertical aperture for the reception of the king bolt of the wagon, said block being longitudinally pivoted between the inner cross arms to permit the wagon to rock laterally, a front cross arm connecting the frame in advance of the inner arms, a roller mounted centrally upon the front arm to bear upwardly beneath the fifth wheel ring, a circular track of greater diameter than and concentric with the said ring, means for securing the track beneath the front end of the wagon, a rear cross arm connecting the rear terminals of the side bars above the circular track, and a roller carried by said cross arm and bearing downwardly upon said track.

14. A device of the class described comprising in combination, a connecting frame having side bars pivoted at their front ends for up and down swinging movement to the axle housings of a tractor, a draft link horizontally pivoted at its front end to the draft bar cap of the tractor, depending arms carried by the side bars and horizontally pivoted to the rear end of said link, said side bars extending upwardly towards the rear and converging, the upper, rear end portions being parallel and substantially horizontal, front, rear and intermediate cross arms rigidly connecting the rear ends of the side bars together, the upper fifth wheel member secured to the wagon, a circular track of greater diameter than the fifth wheel member, means for connecting said track to the wagon in concentric relation to and on a lower plane than the same, a front roller carried by the front cross arm, a rear roller carried by the rear cross arm, and a block having a central, vertical opening and longitudinally pivoted between the intermediate cross arms for lateral rocking movement, said connecting frame being adapted to be connected to the wagon after the front axle, front wheels and the lower ring of the fifth wheel have been removed, the king bolt traversing the pivoted block and with the front roller bearing beneath the upper fifth wheel member in advance of the king bolt and the rear roller bearing on top of the circular track in rear of the king bolt.

15. A device of the class described comprising in combination, a frame adapted to connect a tractor to a dump wagon, after the front axle, front wheels and lower ring of the fifth wheel of the latter have been removed, said frame comprising rearwardly converging, upwardly extending side bars pivoted at their front, free ends to and beneath the outer extremities of the axle housings of the tractor, a central, longitudinal draft means connecting the intermediate portions of the side bars to the draw bar cap of the tractor, cross arms connecting the rear, elevated ends of the side bars, a longitudinally pivoted, swinging block mounted between a pair of the cross arms and having a vertical opening for the king bolt of the wagon, a front roller carried by the front cross arm to bear beneath the upper ring of the fifth wheel, a rear roller carried by the rear cross arm, a circular track connected to the wagon in concentric relation to and below the fifth wheel ring to bear beneath said rear roller, forwardly extending brace arms terminally connected to the wagon, said arms being secured to the rear portion of the track and having an eye to receive and brace the lower end of the king bolt, and a spacer block surrounding the bolt between the eye and the pivoted block.

In testimony that I claim the foregoing as my own I have hereto affixed my signature.

CLOYD DAVIS.